United States Patent
Rudolph

[15] 3,670,571
[45] June 20, 1972

[54] JET DEFLECTION VAPOR GAGE

[72] Inventor: Ralph G. Rudolph, Edgewood Borough, Pa.

[73] Assignee: United States Steel Corporation

[22] Filed: Dec. 5, 1969

[21] Appl. No.: 882,540

[52] U.S. Cl. ........................................................73/194 R
[51] Int. Cl. ...............................................................G01f 1/00
[58] Field of Search......................................................73/194

[56] References Cited

UNITED STATES PATENTS

| 3,102,422 | 9/1963 | Hatfield | 73/194 |
| 3,343,413 | 9/1967 | South | 73/194 |
| 3,399,565 | 9/1968 | Schmaeng | 73/194 |

FOREIGN PATENTS OR APPLICATIONS

| 1,518,845 | 3/1968 | France | 73/194 |

Primary Examiner—Richard C. Queisser
Assistant Examiner—C. E. Snee, III
Attorney—Rea C. Helm

[57] ABSTRACT

A gage for measuring the flow rate of a vapor in an evacuated chamber has a narrow jet of air directed across an opening through which a stream of the vapor passes. The vapor deflects the air jet in proportion to the amount of material in the vapor stream. The flow rate is determined by measuring the air pressure on the side of the opening opposite the air jet.

5 Claims, 6 Drawing Figures

INVENTOR
RALPH G. RUDOLPH

By Rea C. Helm

Attorney

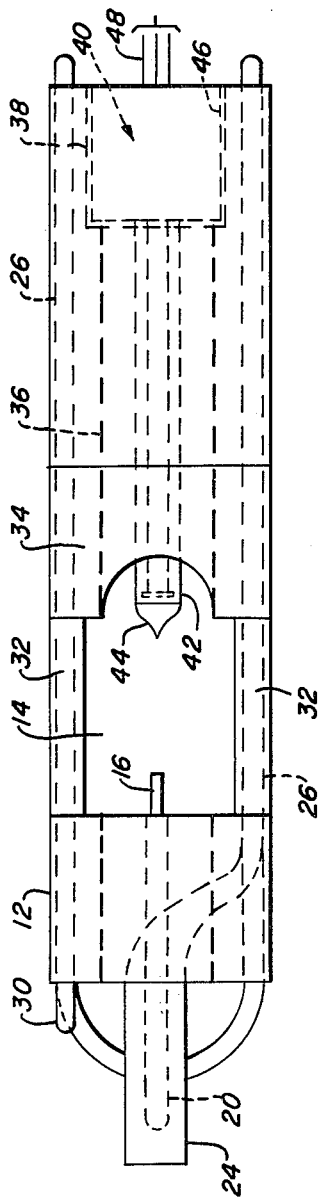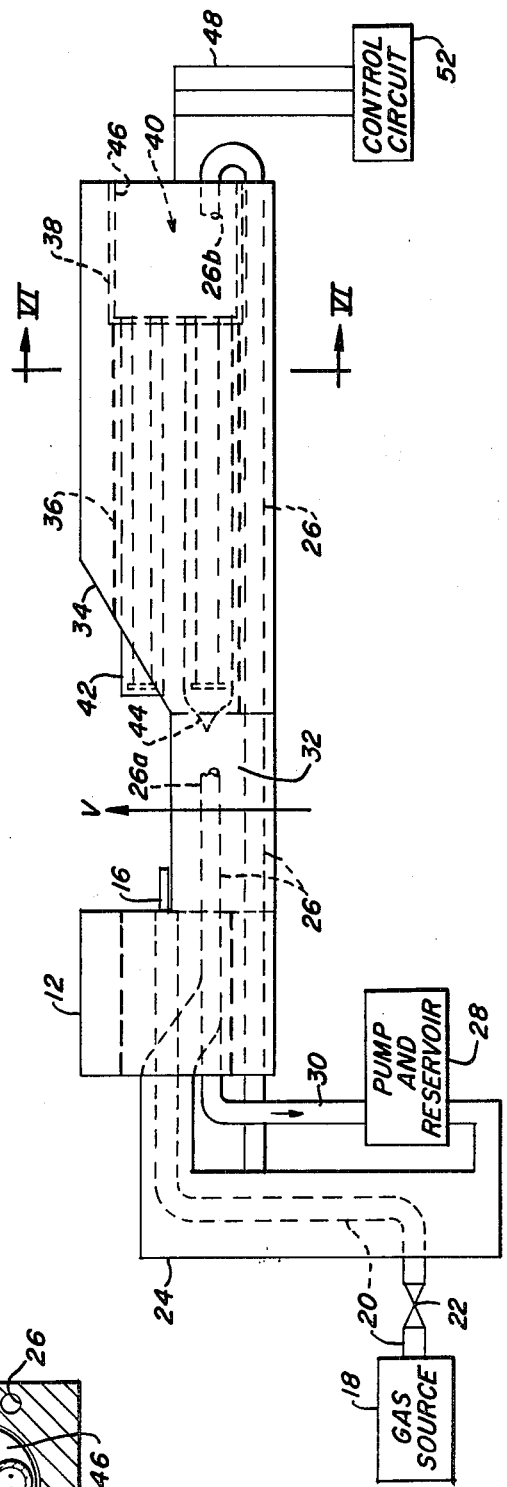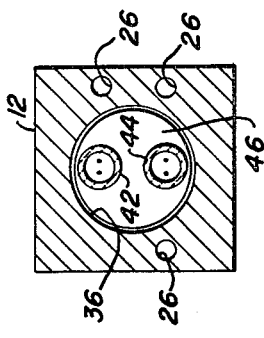

JET DEFLECTION VAPOR GAGE

This invention relates to a gage for measuring vapor flow and more particularly to a gage for measuring the evaporation or flow rate of a material heated in an evacuated chamber to vaporizing temperature.

In certain processes, such as the deposition of aluminum vaporized by an electron beam gun on a steel strip, it is necessary to measure the evaporation rate of a material heated to vaporizing temperature in an evacuated chamber to determine evaporation efficiency, coating rate, vapor distribution, and system malfunctions to preclude manufacture of inferior product and excessive line down time.

Such a gage must be able to operate in a high vacuum, in changing pressure levels, in temperatures up to 400° F and in fluctuating electric and magnetic fields of strong intensity. The gage must measure electrically ionized vapor particles at high evaporation rates for sustained periods of time in the presence of free electrons.

Measuring devices with which I am familiar all fail to meet one or more of these requirements. Quartz crystal gages, in which changes in resonant frequency is measured as vapor condensation builds up on the crystal surface, are limited to the time required to accumulate a measurable deposit and are not suitable for high evaporation rates. Ionization gages which measure the charge on insulated plates when an electron beam ionizes a portion of the vapor it passes through are suitable for low evaporation rates, are sensitive, require shielding and must be cleaned after about 3 hours use. X-ray gages which measure the amount of characteristic radiation the vapor emits when X-rays pass through it are complex, difficult to shield, respond slowly and must be cleaned frequently. X-ray or beta-ray thickness gages which measure the thickness of coating deposited on a substrate exposed to the vapor respond too slowly and are inaccurate since the thickness of coating is not a function of the evaporation rate alone.

According to my invention, I pass a narrow jet of gas through a vapor stream perpendicular to the direction of flow and measure the resultant gas pressure on the other side of the vapor stream with a Pirani gage. This pressure is proportional to the amount of metal passing through the stream or the evaporation rate. This provides a fast, stable and sensitive measure of high level evaporation rates.

It is, therefore, an object of my invention to provide a sensitive stable apparatus for measuring high intensity metal evaporation rate with a fast response.

Another object is to provide such an apparatus that can operate in changing pressures, a high vacuum, high temperatures and in strong fluctuating magnetic and electric fields.

These and other objects will become more apparent after referring to the following drawings and specification, in which:

FIG. 4 is a plan view showing details of the gage block;

FIG. 5 is an elevation of the block showing details and connections to the block; and FIG. 6 is a sectional view of the block along line VI—VI.

Figure 2:
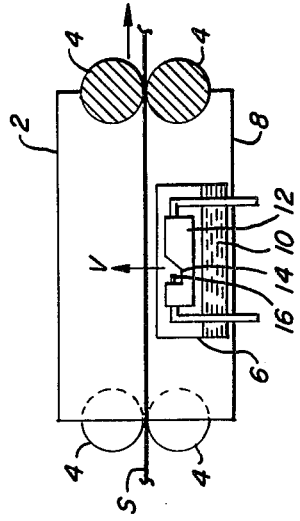
FIG. 2 is a sectional elevation of the deposition chamber of FIG. 1 along line II—II.
Figure 1:
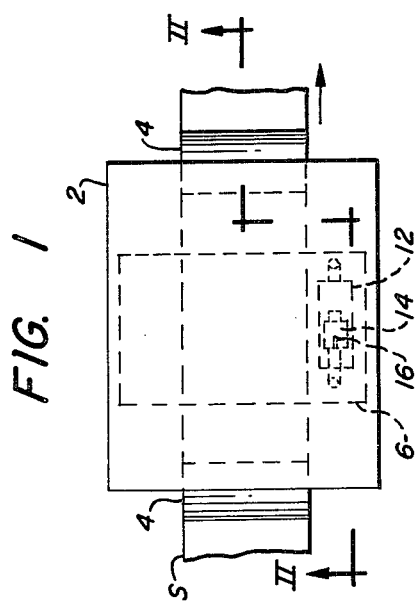
FIG. 1 is a plan view of a deposition chamber showing the gage block location.
Figure 3:
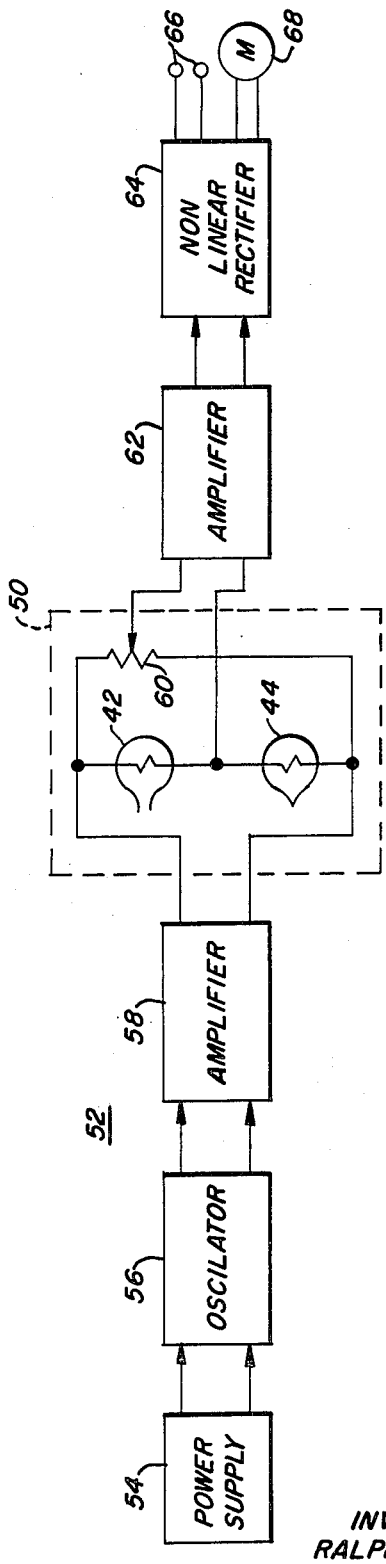
FIG. 3 is a block diagram of the control circuit of the gage.

Referring now to the drawings, reference numeral 2 indicates a vacuum deposition chamber. Strip S passes through chamber 2 between sealing rolls 4 to be coated by a deposit of aluminum vapor. A crucible 6 resting on bottom 8 of chamber 2 contains aluminum 10 which is vaporized to a vapor V by an electron beam gun (not shown). This is a conventional aluminum coating apparatus.

A brass gage block 12 is disposed inside chamber 2 so that part of the vapor V from crucible 6 passes through a generally rectangular cross-sectional shaped aperture 14 in gage block 12. A needle jet 16, such as a number 25 gage hypodermic needle projects at right angles from a centrally disposed location in one face of aperture 14 which is parallel to the direction of flow of vapor V. A source of gas such as air 18, which is at a pressure higher than that inside chamber 2, is connected to jet 16 by a conduit 20, which may be one-fourth -inch copper tubing, through a needle valve 22. A cooling jacket 24 surrounds conduit 20. Cooling passages 26 are located in the sides of block 12 and are connected to jacket 24 and a conventional pump and reservoir system 28 to circulate cooling water 30. Side faces 32 of aperture 14 are parallel to the direction of vapor flow and extend from the vapor entry end of aperture 14 to the level of needle jet 16. The face of aperture 14 opposite jet 16 is parallel to the direction of flow from the vapor entry end to the level of needle jet 16 where face 34 slopes away from jet 16 at an angle of about 30° to the exit end of aperture 14.

Centered in block 12 on the face of aperture 14 opposite jet 16 is an opening 36 having a counterbore 38 at the end remote from aperture 14. A thermal-conductivity tube 40, such as a Pirani gage tube, Type 220103-15 manufactured by Consolidated Electrodynamics Corporation, Rochester, New York, will all but 1 inch of the metal shell at the base removed, is fitted in block 12 so that open tube element 42 and closed tube element 44 are centered in opening and the remaining metal shell fits counterbore 38. Conduit 26 is shown as discontinued from 26a to 26b in FIG. 5 to better illustrate the location of tube 40. Open element 42 is in axial alignment with jet 16. A base 46 of tube 40 has connections 48 to a bridge 50 in a control circuit 52 located outside of chamber 2.

In control circuit 52, a 110 volt, 60 cycle power supply 54 drives a conventional oscillator 56 to provide a 25 kilocycle output which is amplified by amplifier 58 and is connected to bridge circuit 50. Bridge circuit 50 is connected to tube elements 42 and 44 and a potentiometer 60. The output of bridge circuit 50 is connected to an amplifier 62 which is connected to a non-linear type rectifier 64 having output terminals 66 and an output ammeter 68.

To operate my gage, control circuit 52 is energized, the air flow rate is set by needle valve 22 and the cooling water turned on. Potentiometer 60 is adjusted to zero. Gage block 12 is aligned so that vapor V from crucible 6 will pass through aperture 14 perpendicular to the flow of air from jet 16.

As metallic vapor passes through aperture 14, the amount of air arriving at element 42 decreases as the air stream from jet 16 interacts with an increasing vapor stream. This decreases the pressure on element 42, increases the element resistance and unbalances the bridge circuit 50 sending a signal to amplifier 62 which is proportional to the rate of flow of vapor passing through aperture 14. With the flow rate through aperture 14 known, the evaporation rate is then determined from the known proportion of the total vapor that passes through aperture 14. Since the element 42 has a non-linear response, the signal from amplifier 62 is then rectified in rectifier 64 to provide a direct current signal on meter 68 and a linear direct current signal for process control purposes at terminals 66.

The Pirani gage may operate on direct current but alternating current of 10 kilocycles to 25 kilocycles is preferred to minimize noise created by the electron beam and the gas jet. Direct current would not be desirable in the surroundings of free electrons and ionized gas.

Although the gage operates in an evacuated chamber, the amount of air coming out of the jet is so small that it does not affect the deposition of metallic vapor in chamber 2. The sloping face 34 is provided so that air may move in the direction of the vapor stream away from the entry to element 42 and thus continuously provide a reading on meter 68. The cooling jacket 24 maintains the air at a constant temperature as it emerges from jet 16 to minimize the variation in gage readings caused by gas temperature changes. Air is used because it is readily available, other gases are also satisfactory. Cooling block 12 by circulating cooling water 30 through passages 26 eliminates any variation caused by temperature differences between element 42 and element 44 of tube 40 and also minimizes adherence of aluminum vapor to block 12. Aperture 14 is shown as rectangular as a matter of convenience, it could be another shape, such as circular, or omitted if independent mounting for jet 16 and tube 40 is available.

While my gage has been described for measuring aluminum vapor in an evacuated chamber, it may be used to measure the evaporation or flow rate of any material heated to vaporizing temperature in an evacuated chamber provided a stream may be directed through aperture 14 perpendicular to jet 16.

While one embodiment of my invention has been described, it is obvious that other modifications may be made.

I claim:

1. Apparatus for measuring the flow rate of a vapor stream located inside an evacuated chamber comprising a gage block located inside the chamber and having an aperture in axial alignment with the direction of flow of the vapor stream and through which a part of the vapor stream flows, means for directing a narrow stream of gas from one side of the aperture across the aperture generally perpendicular to the direction of flow of the vapor stream so that the gas stream will be partially deflected by the vapor stream, a thermal-conductivity gage on the side of the aperture opposite the means for directing the gas, said gage having an open unit in axial alignment with the gas stream and a closed unit, a source of high frequency power, a bridge circuit connected to the power source having one arm connected to the closed unit and another arm connected to the open unit, and means connected to the bridge circuit output for indicating gas pressure on the open unit.

2. Apparatus according to claim 1 in which the means for directing a stream of gas includes a needle jet located in the gage block, a source of gas under pressure greater than the pressure in said chamber, a gas conduit connecting the needle jet to the gas source, a liquid cooling medium, a cooling jacket surrounding the gas conduit, a cooling passage in said block connected to said jacket, and a recirculating cooling liquid system connected to the jacket and the passage for circulating the cooling medium.

3. Apparatus according to claim 1 in which the aperture has four faces and a generally rectangular cross-sectional shape, the means for directing a stream of gas terminates on a centrally disposed location on one face which is generally parallel to the direction of vapor flow, the face opposite the gas directing means is parallel to the direction of vapor flow from the vapor entry end to the measuring means and slopes progressively further away from the gas directing means from the measuring means to the vapor exit end, and the third and fourth faces are generally parallel to the direction of vapor flow and extend from the vapor entry end to an intersection with a plane perpendicular to the direction of vapor flow and containing the gas stream, thereby facilitating the flow of gas away from the measuring means.

4. Apparatus according to claim 3 in which the means for directing a stream of gas includes a needle jet located on said one face of the aperture, a source of gas under pressure greater than the pressure in said chamber, a gas conduit connecting the needle jet to the gas source, a liquid cooling medium, a cooling jacket surrounding the gas conduit, a cooling passage in said block connected to said jacket, and a recirculating cooling liquid system connected to the jacket and the passage for circulating the cooling medium.

5. Apparatus according to claim 4 which includes an electron beam gun in the evacuated chamber, and in which the gas is air, and the vapor is aluminum heated to vaporization by the electron beam gun.

* * * * *